United States Patent [19]

Hicks

[11] Patent Number: 5,319,401
[45] Date of Patent: Jun. 7, 1994

[54] CONTROL SYSTEM FOR PHOTOGRAPHIC EQUIPMENT

[76] Inventor: Ray Hicks, 2605 Corunna Rd., Flint, Mich. 48503

[21] Appl. No.: 824,758

[22] Filed: Jan. 17, 1992

Related U.S. Application Data

[63] Continuation of Ser. No. 649,444, Feb. 1, 1991, abandoned, which is a continuation-in-part of Ser. No. 358,933, May 30, 1989, abandoned, and a continuation-in-part of Ser. No. 359,852, May 31, 1989, Pat. No. 5,097,292.

[51] Int. Cl.⁵ ............................................. G03B 27/32
[52] U.S. Cl. ..................................... 354/76; 354/106; 355/40
[58] Field of Search ................................ 354/105–109, 354/75, 76; 355/40–43, 77, 38, 75, 76

[56] References Cited

U.S. PATENT DOCUMENTS

| | | | |
|---|---|---|---|
| 4,417,811 | 11/1983 | Hamen | 355/77 |
| 4,432,637 | 2/1984 | Baschung | 355/40 X |
| 4,862,200 | 8/1989 | Hicks | 355/40 X |
| 4,862,222 | 8/1989 | Stande et al. | 355/77 X |
| 4,918,484 | 4/1990 | Ujiie et al. | 355/77 X |
| 4,935,809 | 6/1990 | Hayashi et al. | 355/38 |
| 4,974,096 | 11/1990 | Wash | 354/76 |
| 5,097,292 | 3/1992 | Hicks | 355/75 |

*Primary Examiner*—David M. Gray
*Attorney, Agent, or Firm*—Krass & Young

[57] ABSTRACT

The invention is a method for controlling automated photographic equipment, for example, printers, color analyzers, film cutters and film baggers. Machine readable data is permanently imprinted on photographic negatives. Included in this data is discreet identifying information for a single photographic negative frame. A data base is separately created, with each record correlating to the individual photographic negative. The combined information from the photographic negative and the data base are used to operate a variety of automated photographic printing equipment, via a computer network.

8 Claims, 2 Drawing Sheets

CONTROL SYSTEM FOR PHOTOGRAPHIC EQUIPMENT

RELATED APPLICATIONS

This is a continuation of copending application Ser. No. 07/649,444 filed on Feb. 1, 1991, now abandoned, which is a continuation in part of Ser. No. 358,933, filed May 30, 1989, now abandoned, for Improved Control System for Photographic Equipment, and Ser. No. 359,852, filed May 31, 1989, now U.S. Pat. No. 5,097,292, for Improved Film Drive System for Photographic Printer.

FIELD OF THE INVENTION

The invention relates to improved methods for controlling automated photographic equipment, for example, printers, color analyzers, cutters, baggers and the like.

BACKGROUND OF THE INVENTION

Commercial photographic printing processes involve the use of multiple pieces of equipment, each performing well-defined functions. For example, a typical commercial photographic printing facility may utilize a film developing station, a film color analyzer, a printer, a print cutter, a print sorter and a print bagger. The object of the concerted operation of this equipment is the economical production of high quality photographic prints from an individual negative.

Commercial photographic printers are devices capable of exposing photographic positive paper in response to illumination from photographic negatives. These processes are well known in the art. Because of the economies of scale, it is desirable to print photographs in a commercial environment as quickly and accurately as possible. In the past, commercial photographic printing equipment utilized manual techniques for transporting large reels of film through the printer. Typically, a printer operator would hand crank a "take-up" reel to pull a roll of negatives from a feed reel, across the exposure window or "gate" and the frame of the printer. This system was prone to operator error and damage to the film. Accordingly, efforts were undertaken to develop an automated approach to the process, and in recent years, mechanically operated film drive mechanisms have been used to transport the film through such printers.

Typically, some of this equipment is capable of operating in a manual, automatic, or semi-automatic mode. The commercial printer may require a human operator to manually look through a series of negatives, locate an appropriate negative, and place the negative in proper position and orientation in the printer for producing a suitable exposure of the negative on the photographic paper Thereafter, the operator will cause the machine to cycle and thereby expose the paper. In determining how the prints are to be made, the operator may be guided by certain predetermined parameters, for example, color balance, position of the subject in relation to the edges of the negative, and the desired "order" information from the customer, i.e., how many prints of a particular size are desired from a given negative. Such manual operations may also be applicable to machines such as color analyzers or print cutters. Manual operations of this nature are very prone to error, due to the large number of photographic prints which a processing facility must produce in a given time period, and due to the fact that the operator is often viewing a negative image. Further, manual operations which attempt to correlate particular photographs with particular customer or photographer instructions are plagued with error, inasmuch as photographic negatives do not normally contain any information correlative of the subject with such instructions. Attempts to minimize errors in processing using manual methods have, accordingly, been directed toward modern automation techniques.

Initially, photographic equipment has been developed which relies upon physical marks placed on the photographic negative itself. Early attempts to automate the printing process utilized the addition of a notch cut in the edge of each negative in a continuous roll of film. Photographic equipment through which such rolls of negative film were transported could, utilizing a sensor, determine the existence and position of such a notch, and thereby offer some machine control over the process of handling said negatives. For example, a printer operator could rapidly advance to the next frame in a roll of film simply by operating a switch which would advance the film to the next frame.

It became apparent that this system could be improved upon by substituting punched holes along the edge of the negative, in place of a single notch. Certain printers, for example, could identify up to 10 punched hole positions on any negative. These holes could be placed in a predetermined pattern and thereby provide a discreet frame number for each negative, a discrete package code, and density information. Further, special circumstances (such as a "blink" frame, where the subject had blinked at the time the shutter of the camera was operated) could be identified with a special "blink code", thereby alerting the operator to skip printing of that frame. Thereafter, efforts were undertaken to automate the operation of the commercial photographic equipment further, by allowing the equipment to operate automatically based on the pre-punched codes. An entire roll of negative film could be pre-punched, and an automated photographic printer, for example, could process the entire roll with minimal human intervention.

This method, too, had shortcomings. No method existed for selectively altering the punched codes once they had been placed on the film. Further, because of the inherent space limitations of the physical size of such film, it was impossible to encode certain information necessary to the successful production of consistent quality prints. Accordingly, efforts were made to prepare machine readable data and instructions which could operate associatively with the notches or punched codes. Early efforts led to the production of commercial photographic printers which utilized magnetic tape to send pre-programmed package instructions to a printer in sequence in response to the signals generated by notched film. These efforts met with only limited success however, inasmuch as a single machine reading error produced consecutive errors in film package printing sequences.

To overcome these difficulties, micro-computer technology was first applied to create dedicated controllers which contained permanent, resident memory routines which operated a single piece of photographic equipment in response to codes punched on the negative film. More recently, devices and methods have been developed which allow correlation of electronically stored data relating to a particular film negative. Such technology is disclosed in U.S. Pat. application No. 07/172,805, currently pending, and subject to certain allowed claims therein.

It is desirable, however, to increase the flexibility of present art to allow total computer control over the entire photographic printing process. Data regarding any photographic negative must be storable and retrievable associatively with each discrete photographic negative. In addition, the data must be modifiable by the commercial photographic studio. Moreover, the data must be accessible to each type of photographic processing equipment within the photographic processing facility, either by use of transportable media, or over a computer network. The present invention is a method to achieve these desired goals.

SUMMARY OF THE INVENTION

It is an object of the invention to provide a common data base of computer data for the operation of automated photographic equipment.

It is a further object of the invention to permit computer control of multiple pieces of photographic equipment, based on a predetermined series of parameters.

It is a further object of the invention to allow non-sequential location of any designated photographic negative through the use of machine readable marks.

It is a further object of the invention to allow automated analysis, printing, separation, sorting and packaging of individual photographic negatives and prints, without regard to sequence, and to be able to modify previously stored data regarding said negatives and prints to accomplish this result.

It is a further object of the invention to provide for photographic equipment which allows the machine reading of a variety of codes for automated operation of the photographic equipment, and for communication with computers and computer networks.

DESCRIPTION OF THE PREFERRED EMBODIMENT

Figure 1:
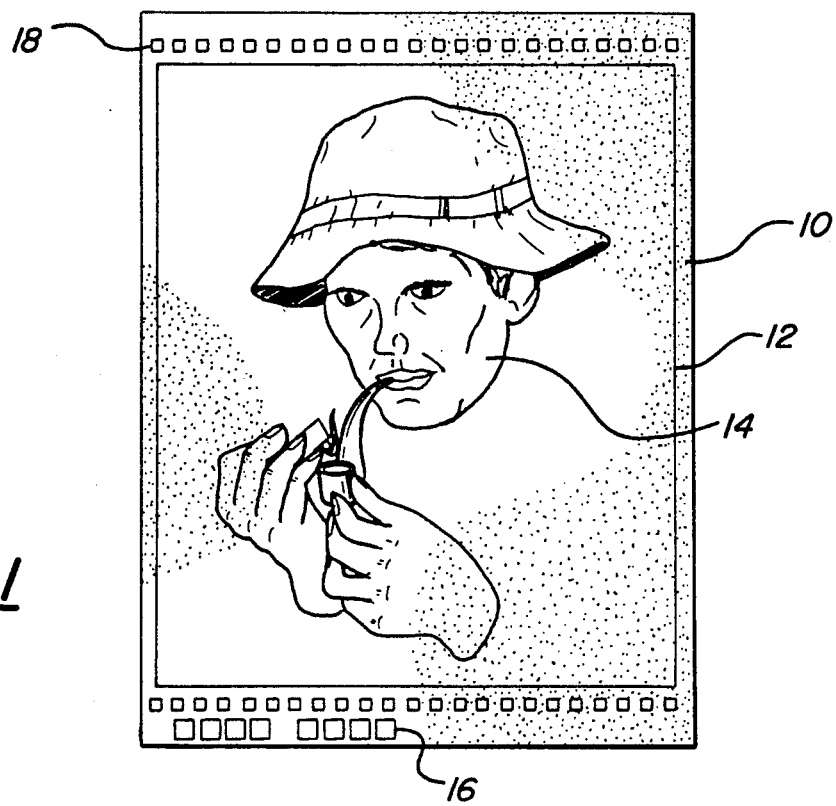
FIG. 1 is a view of a photographic negative, showing parameters which are the subject of incorporation and modification by the printing process.

With reference now to FIG. 1 a typical photographic negative 10 containing a single frame exposure 12 of a subject 14 is shown. Typically, such film contains openings 18 for camera or other photographic equipment transporting pins. In the preferred embodiment, the photographic studio has punched machine readable punch holes 16 in a predetermined pattern, usually near the edge of the film negative 10.

The photographic negative may be exposed in either "portrait" or "landscape" format. The subject shown in FIG. 1 is shown in portrait format, i.e., the vertical dimension of the photographic negative is larger than the horizontal dimension. In landscape format, the dimensions are reversed. The photographic negative also has certain inherent optical properties in addition to orientation: size, over-all density, color balance, orientation of center of subject in frame. In addition, the customer has certain desired attributes which he would expect of a finished print, such as attractiveness, contrast, focus, cropping and composition. Finally, the customer has certain specific instructions to the printing laboratory, for example, number of copies and size of prints.

The size of the film is pre-selected by the photographer, and is a function of the capabilities of the type of camera used. Density is a function of film type and exposure conditions and methodology. Color balance is a function of many factors, including background, temperature, age of film, exposure and lighting. The orientation of the subject in the frame is likewise originally in the photographer's control.

The customer's unspoken expectations are often well-known to the printing lab. For example, a "blink" photograph, showing the subject with his eyes shut is inherently an undesirable photo, and hence, unattractive. The subject wishes to have principal features of the photo in good contrast to the surroundings and in focus. Further, it is desirable that the subject be centered in the finished print, and properly positioned in relation to other objects. In FIG. 1, for example, the fisherman's pipe was obviously a desired attribute and element of the photo. The photo lab is also experienced in cropping photographs, that is, removing portions of one or more edges of the photograph to make more visually pleasing the over-all appearance of the finished photograph.

The key explicit expectation from the customer is the package composition of a given photographic exposure. For a school picture sitting, the student may wish to have one 8"×10" color portrait for his family, and multiple wallet-size photos to exchange with friends. In contrast, the typical amateur photographer will request one print of each photographic negative on a roll of developed film.

In many respects, certain attributes of photographic finishing tasks may be consistently prevalent in an entire printing project. Take, for example, the school photographer who inadvertently mis-centers each of his subjects in the camera frame for an entire school population. In such a case, the photographic printer should be instructed to offset the negative by a predetermined dimension in either or both of two axis, the X or Y axis. The Y axis, referring to FIG. 1, is the vertical axis of the picture, while the X axis is the horizontal axis. In other cases, the editing task for each photograph must be determined on a photograph by photograph basis.

Figure 2:
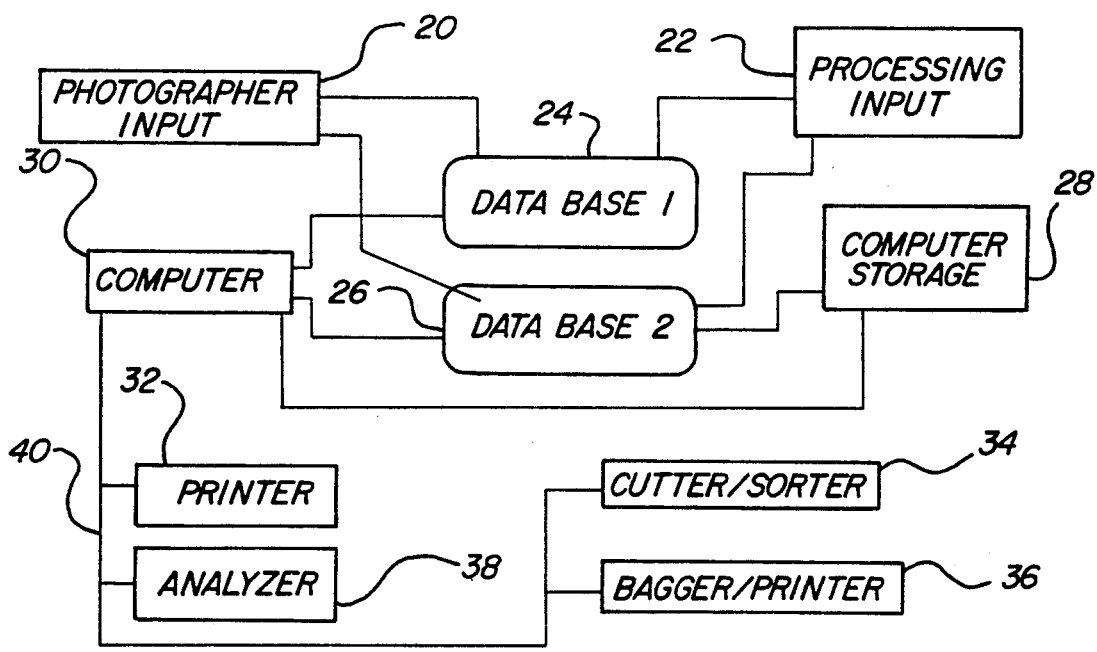
FIG. 2 is a flow chart showing the various steps of the process.

With reference then, to FIG. 2, the process herein claimed may be further understood. The photographer supplies specific input data 20 to the photographic processing facility. This input 20 is in the form of the photographic film, and associated recorded data about the film and the subject (e.g. package information). This input recorded data may be recorded manually, such as in a hand-written log, or by electronic means, such as a computer diskette. When the film is received at the processing facility, the film is developed, and viewed by an editing operator, who views the film and causes identifying marks to be placed on the film. This processing input 22 may take the form of identifying information, such as a negative frame number or serial number, and may also include editing data such as "blink" designation, color correction, density, balance or package information. Some or all of this information is recorded on the film in machine readable format. Although the preferable method of so recording the data is by virtue of punched holes, many other methods may be utilized. The punched holes may be replaced with machine readable inks or labels containing bar codes, for example. The combined collected data 20 and 22 stored on the photographic negative itself is collectively referred to as data base 1, shown in FIG. 2 at 24.

The photographer and the photographic processing facility likewise transmit certain processing input data 20 and 22 to a data base 2 26, which is managed by computer 30 and/or computer storage means 28. Typically, this data is correlated to data base 1 24, through the use of identical identifying or serial numbers correlating to identical photographic prints. Photographer's input to data base 2 26 may take the form of modified requests from the subject to regarding package composition, for example. Processing input 22 from the processing facility which is not physically encoded on the film is typically of the type applicable to an entire photographer's job, such as an X or Y axis offset as above described. Through the use of the processing input step 22, the data base 2 may be selectively altered to tailor the automated operation of various pieces of photographic equipment, such as a printer 32, cutter/sorter 34, bagger/printer 36, and color analyzer 38.

Further, computer 30 and its associated components can be pre-programmed to send appropriate equipment operation instructions to the various pieces of photographic processing equipment, and to receive feedback data from said equipment over a computer network 40, using commercially-available computer networking techniques. Data base 2 can be selectively altered at the analyzer 38, in the preferred embodiment, to reflect color correction information which applies to selected photographs only. Each piece of equipment 32, 34, 36 and 38 preferably provides, over the network, data to the computer confirming that a particular printing task is complete. The data base 2 is then updated, accordingly, with data establishing job completion. Data base 2 can thereafter be used to generate reports to the photo processing facility regarding job completion, the necessity for reprints, labelling and accounting information. Throughout the process, additional processing input data 22 can be input to the process via conventional computer input devices, such as keyboards, to selectively modify the information stored in data base 2.

The usefulness of this system can be seen in the following example: A photographer having taken a series of photographs 10 of subjects 14 forwards the film and electronic media containing package instructions to the photographic processing facility. Portions of the data 20 so transmitted include package instructions for subject S. The designated operator at the processing input station at the photographic processing facility initially inputs a serial number N and package code P in the form of machine readable marks 16 directly to the negative, which then becomes data which is part of data base 1 24. This data is now physically affixed to the film, by virtue, for example, of punched holes in the film negative itself. Thereafter, subject S decides that the package print order which he or she placed with the photographer is incorrect, and requests of the photographer that it be changed. This request is transmitted by the photographer to the photographic processing facility. By use of processing input 22, data base 2 can be modified to contain a special code correlative to serial number N, instructing the printer 32 to disregard the package code P encoded in machine readable form on the negative 10, and substitute package code Q as the package code applicable to serial number N. By way of further example, while negative serial number N is subject to color analysis by color analyzer 38, assume that the color analyzer operator determines that the color balance information for the photograph needs alteration. Such alteration can be transmitted to the data base 2, preferably over network 40, to further modify code associated with serial number N, so that printer 32 makes appropriate color correction when negative N is presented to the printer for printing. In this fashion, the input data 22 can be manually or automatically altered during the commercial printing process.

Figure 3:
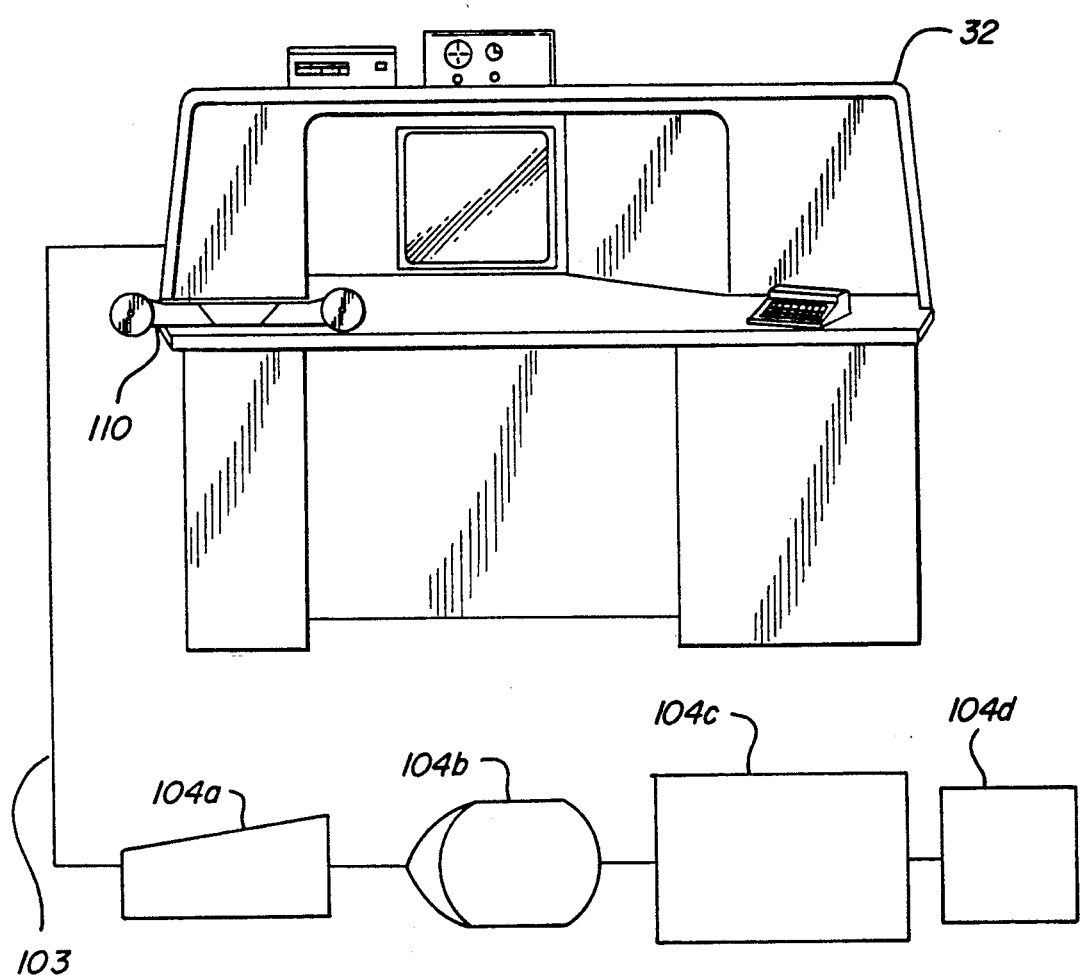
FIG. 3 is a front view of a typical photographic printer, showing simplified interfaces to computers, input/output devices and computer networks.

An example of the type of equipment controlled in the manner of the present invention is the commercial photographic printer 32 of U.S. Pat. No. 5,097,292 as shown in FIG. 3, and is equipped with a film transport assembly 110, a simplified network 103, and a computer with peripheral devices 104a through 104d.

Although the above description and drawings are directed to application of the device in a photographic printer by way of example, the drive is equally suited to adaptation to a variety of color analyzers and editing devices often found in the commercial photographic environment.

Having thus described my new process, it will be obvious to those skilled in the art that many modifications may be made to the process without departing from the invention herein defined.

I claim:

1. A method for processing developed photographic negative film having a plurality of individual frames comprising the steps of:

imprinting each individual frame of said negative film with discrete identifying information;

further imprinting each said individual frame with one coded instruction adaptable to aid in the operation of automated photographic processing equipment;

creating a computer-managed data base of processing information, said data base being independent of and separate from the negative film and having at least one record correlative to each said individual frame using said discrete identifying information;

inserting said film into a first piece of automated photographic processing equipment selected from the group of photographic processing equipment consisting of printers, color analyzers, film cutters, and film baggers;

utilizing said discrete identifying information and said at least one instruction to aid in the operation of said first piece of automated photographic processing equipment and processing of each said individual frames of said negative film;

sensing the conditions of operation of said first automated photographic processing equipment including the identity of the individual frames of film processed therein;

electronically transmitting said sensed conditions of operation of said first equipment to said computer-managed data base;

selectively modifying the records of said data base based on said sensed conditions;

inserting said film into a second piece of automated photographic processing equipment selected from the group of photographic processing equipment consisting of printers, color analyzers, film cutters, and film baggers; and utilizing said modified information in said data base to aid in the operation of said second piece of automated photographic processing equipment and further processing of each said individual frame of said negative film.

2. The method of claim 1, wherein said steps of utilizing and transmitting further comprise communication of said data and said sensed conditions over a computer base network.

3. The method of claim 1, wherein:
said step of utilizing said discrete identifying information and said at least one instruction to aid in the operation of said first piece of automated photographic processing equipment comprises the step of utilizing said information and said at least one instruction to aid in the operation of a color analyzer; and
said step of utilizing said modified information in said data base to aid in the operation of said second piece of automated photographic processing equipment comprises the step of utilizing said modified information to aid in the operation of said second piece of automated photographic processing equipment selected from the group of photographic processing equipment consisting of printers, film cutters, and film baggers.

4. The method of claim 1, wherein:
said step of utilizing said discrete identifying information and said at least one instruction to aid in the operation of said first piece of automated photographic processing equipment comprises the step of utilizing said information and said at least one instruction to aid in the operation of a printer; and
said step of utilizing said modified information in said data base to aid in the operation of said second piece of automated photographic processing equipment comprises the step of utilizing said modified information to aid in the operation of said second piece of automated photographic processing equipment selected from the group of photographic processing equipment consisting of film cutters and film baggers.

5. A method for processing developed photographic negative film having a plurality of individual frames in a photographic developing center having a plurality of automated photographic processing equipment comprising the steps of:
creating a computer-managed data base of photographic equipment processing information, said data base being independent of and separate from said negative film and having at least one record correlative to each said individual frame of film with each piece of equipment;
electronically connecting the data base to the plurality of automated photographic processing equipment;
using the data base to operate a first piece of equipment in the plurality of automated photographic processing equipment to process at least one said individual fame of the film;
sensing the conditions of operation of aid first piece of equipment including the identity of said at least one individual frame of film processed therein;
modifying the at least one record correlative to said at least one said individual frame of film of the data base based on the sensed conditions of operation of the first piece of equipment in the plurality of automated photographic processing equipment; and
using the modified data base to operate a second piece of equipment in the pluraltiy of automated photographic processing equipment to further process said at least one said individual frame of the film, said second piece of equipment being different from said first piece of equipment.

6. The method of claim 5, wherein said step of connecting a data base utilizes a computer network interconnecting each piece of equipment in the plurality of automated photographic processing equipment.

7. The method of claim 5, wherein:
said step of using the data base to operate a first piece of equipment comprises the step of using the data base to operate a color analyzer; and
said step of using the modified data base to operate a second piece of equipment in he plurality of automated photographic processing equipment comprises the step of using the modified data base to operate a second piece of equipment selected from the group of photographic processing equipment consisting o printers, film cutters, and film baggers.

8. The method of claim 5, wherein:
said step of using the data base to operate a first piece of equipment comprises the step of using the data base to operate a printer; and
said step of using the modified data base to operate a second piece of equipment in the plurality of automated photographic processing equipment comprises the step of using the modified data base to operate a second piece of equipment selected from the group of photographic processing equipment consisting of film cutters and film baggers.

* * * * *